Figure 1:
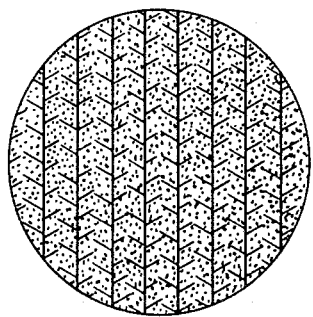

Aug. 27, 1968      G. J. LUTZ      3,399,061
PROCESS FOR IMPROVING THE COLOR OF FREEZE-DRIED COFFEE
Filed March 29, 1965

3,399,061
PROCESS FOR IMPROVING THE COLOR OF FREEZE-DRIED COFFEE
George J. Lutz, Greenwich, Conn., assignor to General Foods Corporation, White Plains, N.Y., a corporation of Delaware
Continuation-in-part of application Ser. No. 265,106, Mar. 14, 1963. This application Mar. 29, 1965, Ser. No. 446,773
3 Claims. (Cl. 99—71)

This application is a continuation-in-part of Ser. No. 265,106, filed Mar. 14, 1963, now abandoned.

This invention relates to improving the color of roasted coffee extract which has been freeze-dried. Generally, it is recognized that rapid freezing will promote the distribution of a large number of ice crystals of small size and that slow-freezing will produce a lesser number of ice crystals of larger size. Thus, in the dehydration of solid foods, such as meats, fruits and vegetables, fast-freezing methods (from a fraction of a second to several minutes) have been used when it is desired not to disturb the cellular structure of the food and slow-freezing techniques (from 15 minutes to several hours) have been used when it is desired to expand the cellular walls of the food. By controlling the freezing rate, the texture and rehydration rate of the material to be dried may also be controlled.

While slow-freezing techniques have been used in regard to solid food materials in order to improve rehydration or improve the texture of the dried food material, slow-freezing of liquid food material has generally been considered undesirable. In the case of liquids, there is no cellular structure to expand and rehydration rates and texture are generally not improved by varying the freezing rate. Thus, in the case of coffee extract, this extract has been frozen and then freeze-dried under varying conditions. However, slow-freezing of such extract has never been suggested or tried as a means for achieving an improvement in the color of the final dried product. Several patents disclose differing techniques for freeze-drying of coffee, but none of these patents indicate any advantage for varying the freezing rate prior to freeze-drying. Irwin, Jr., 2,292,477, for example, states that the coffee extract may be frozen rapidly or slowly, the freezing rate not being important in the final product which is freeze-dried. Similarly, the Saunders patent (U.S. 2,853,796) indicates that slow-freezing of a natural juice or other liquid-containing substance is undesirable since the water of crystallization which is frozen, is not necessarily in a crystalline form and the task of subsequently separating the water from the solids is naturally increased. Other patents relating to freeze-drying of coffee, such as Colten 2,751,687 and Flosdorf 2,509,681, fail to disclose any variation in the freezing rate.

When roasted coffee extract has been frozen and then freeze-dried according to the procedure of the above patents, a light, uncoffee-like color is obtained in the dried product. This color, whether it be a light brown, tan, or mustard-like color, is undesirable from an appearance standpoint.

It would, therefore, be highly desirable if a simple method were devised for controlling the color of freeze-dried coffee and, more particularly, if a simple method were devised whereby freeze-dried coffee could be made darker and more coffee-like in color and appearance.

This invention is founded on the discovery that the color of freeze-dried coffee is determined by the rate of freezing the liquid coffee extract.

Specifically, this invention relates to producing a darker, more coffee-like color in freeze-dried coffee, said coffee having a Munsell color rating of between 12.5, 2.5/4 and 17.5, 5/6, by a process which comprises slowly cooling the coffee extract from its ice point to below its eutectic point over a period of at least 15 minutes to therby form a crystalline structure of substantially pure water ice distributed in a matrix of a eutectic mixture of water, coffee solids and aromatics, and freeze-drying said frozen extract.

As used in this application, "ice point" refers to that temperature at which the water in roasted coffee extract begins to crystallize as substantially pure water ice. "Eutectic point" means that temperature at which a specific mixture of coffee solids, volatile aromatics and water having the lowest melting point of any other mixture in the extract, solidifies. In effect, this temperature is the lowest possible melting point of any material contained in the extract. "Product temperature," as used herein, means the temperature of the dried coffee extract. "Freeze-drying," as used in this context, refers to the process of drying whereby water is removed directly from the solid state to the vapor state without passing through an intermediate liquid state (sublimation). This process also includes that portion of the drying process wherein all of the water ice crystals have been sublimed and a eutectic mixture of coffee solids, aromatics and water is dried to a stable moisture content. In this portion of the freeze-drying process it is possible that some evaporation of water from the liquid state may occur without appreciable melting of the frozen extract. However, even at this stage of drying, the product temperature should be kept below the eutectic point of the material being dried in order to avoid melting any portion of the frozen coffee extract.

The ice point of coffee extract will vary with its solids concentration; dilute extracts (20–28% soluble solids) will begin to form crystals of water ice at temperatures slightly below the freezing point of pure water, while more concentrated extracts will begin to form water ice crystals at temperatures further below the freezing point of water. However, regardless of the initial coffee solids concentration in the extract, the eutectic temperature will always be constant at about $-13.5°$ F.

When coffee extract is cooled slowly in accordance with this invention, it is found that water will first crystallize in the form of discrete crystals as the temperature of the extract passes the ice point. For 28% soluble solids extract this temperature will be about 27° F. As cooling continues these crystals will grow into thick webs of ice as water continues to precipitate from the extract and the liquid portion of the extract is progressively concentrated into a concentrated eutectic mixture of water, coffee solids and aromatics. As the temperature continues to drop, a point is reached wherein all the water which is not part of the eutectic composition (about 66% by weight of the total water present in the extract) is frozen; upon passing this point ($-13.5°$ F.), the liquid eutectic upon further cooling will solidify. Since the temperature of the extract as it is lowered will cause more and more water to be crystallized from the liquid matrix until a solids concentration is reached wherein only a eutectic mixture remains, this mixture will freeze at the lowest freezing temperature of the system without further separation of water crystals.

When slowly cooling the extract, it is preferable that heat removal be uniform throughout the freezing step since this assures a uniform growth of ice crystals throughout the body of extract. In the case of a 0.5" thick layer of coffee extract and a 15 minute cooling step, the heat removal rate should be uniform at 2 calories per gm. per cc. of frozen extract per minute. However, it is possible to slow-freeze in accordance with this invention by having an average heat removal rate of 2 calories per gm. per cc. per minute over a 15 minute cooling time while having the heat removal rate deviate during the freezing step to as high as 5 calories per gm. per cc. per minute. Of course, the slow-freeze operation can be carried out over a period greater than 15 minutes and preferred results are attained at 30–120 minutes and as high as 180 minutes. However, at an average heat removal rate of less than 0.5 calorie per gm. per cc. per minute (2 hours freezing time) no advantage in dark color is realized.

Since the cooling step of this invention provides a gradual precipitation (crystallization) and separation of water present in the extract, the aromatic substances which are present in the liquid portion of the extract are progressively concentrated to a liquid eutectic composition wherein the aromatics can be preserved during subsequent drying. This eutectic composition assumes the form of a liquid matrix of water, aromatics and coffee solids (soluble and insoluble) having relatively pure crystals of water ice distributed in the interstices of the matrix. When the extract is finally cooled to a temperature below the eutectic point for the coffee extract, the frozen extract will be ready to be freeze-dried.

Figure 2:
Figure 3:
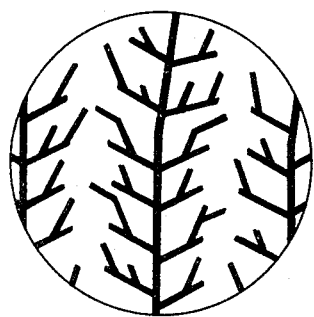
Figure 4:
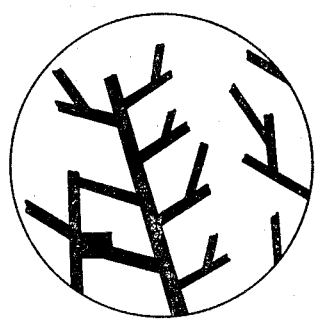

Reference may be had to the drawing in identifying the preferred nonordered dendritic ice crystal structure formed when freezing coffee extract slowly in accordance with this invention. In the drawing, different ice crystal structures are shown at a magnification of about 100 times the original. FIGS. 1 and 2 show an ordered ice crystal structure formed when freezing extract over a period of several seconds to several minutes. This structure is undesirable since it gives a light brown or tan color to the final dried product. FIGS. 3 and 4 disclose the type of nonordered and larger ice crystal growth which typifies the dendritic ice crystal structure of this invention. It is noted that the crystals of ice in FIGS. 3 and 4 form as a distinct phase with eutectic solution distributed between the dendritic ice crystals. When fast freezing methods are used, i.e., several seconds to 5 minutes freezing rate for ice crystal formation, it is seen that the dendritic chains are quite uniform in appearance and characterized by the presence of discrete ice crystals in the eutectic solution located between the dendrites. This ice crystal structure is shown in FIG. 1. Similarly, in FIG. 2, cooling extract over a period of 5 to 10 minutes, avoids the formation of discrete ice crystals in the eutectic solution and promotes larger dendrites of ice crystals but still produces an undesirably light color in the case of coffee extract.

FIGS. 1 and 2 show a completely ordered arrangement of ice crystals wherein the main stems of the dendrites are completely parallel to each other and are formed perpendicular to the cooling surface. FIG. 3, in contrast to FIGS. 1 and 2, discloses that the main stems of the ice dendrites begin to assume a nonparallel or haphazard relation to one another and a nonperpendicular arrangement with the cooling surface. FIG. 4, which represents a preferred ice crystal structure in accordance with this invention, shows a substantially random distribution of the main stems of large ice dendrites.

It should be remembered that slow-freezing is only important for noneutectic water since this is the only water which enters into the dendritic ice crystal growth. Water which forms part of the eutectic solution will not take part in the dendritic ice crystal growth. Therefore, in the case of coffee extract, it is not important to slowly freeze water present in the eutectic solution, and after a nonordered distribution of dendritic ice crystals is formed by slow-freezing the noneutectic water, the remaining water present in the eutectic solution may be frozen quickly.

Various methods present themselves for formation of the dendritic ice crystals, i.e., dynamic freezing and static freezing. In dynamic freezing of the liquid material, the liquid material is agitated or vibrated to prevent supercooling and spontaneous nucleation while giving more uniform heat removal. In static freezing, no overt agitation is used and the liquid material is slowly frozen by contact with a cooling surface which allows slow heat removal from the body of liquid material. Heat removal should be slow enough to permit the growth of dendritic ice crystals of a large enough size wherein the main stems begin to assume a nonparallel formation to one another and a nonperpendicular arrangement relative to the cooling surface.

Supercooling and spontaneous ice crystal nucleation is usually identified with rapid freezing techniques and serves to promote a large number of small ice crystals as distinguished from a lesser number of ice crystals of a larger size. The prevention of spontaneous nucleation helps to promote the growth of dendritic ice crystals by allowing the ice crystals to combine with other ice crystals as they are formed. If the desired rate of heat removal is employed, these dendrites will assume a random distribution which gives a darker color to the final product as distinguished from an ordered distribution of ice crystals. In the latter case, the main stems of the dendrites are substantially parallel to each other and are also perpendicular to the cooling surface which initiates the ice crystal growth.

In cooling the liquid material, it may be advantageous to seed the material with previously formed ice crystals in order to initiate controlled ice crystal growth, prevent supercooling of the liquid material and suppress the spontaneous nucleation of ice crystals, thereby promoting the growth of a smaller number of large ice crystals resulting in a darker colored product. The seeding technique allows an acceleration of the cooling rate while at the same time avoiding spontaneous ice crystal nucleation which usually accompanies an increase in the cooling rate. Spontaneous nucleation as a result of supercooling should be avoided regardless of the freezing method used since this causes instant ice crystal formation throughout the body of liquid.

Before seeding the extract, the extract may be agitated as it is cooled. Ice crystals are added as the extract is depressed to below its ice point and are uniformly dispersed throughout the extract. Agitation is preferably continued until at least partial ice crystal formation has begun. Of course, agitation of the extract is not feasible in the final stages when the extract is almost completely frozen. The use of agitation and/or seeding during the freezing step and specifically during the initial freezing as the extract is cooled to below its ice point provide a preferred embodiment of this invention in that the freezing rate may be accelerated while still producing the desired random distribution of dendritic ice crystals. Agitation of the extract during freezing may also be used to advantage when not seeding the extract. When not seeding the extract, agitation helps to avoid supercooling of the extract and accomplishes more uniform heat removal from the extract.

It appears that the most critical portion of the freezing step is the initial period wherein proper ice crystal growth is initiated. Thus, the simple step of avoiding supercooling and its resultant spontaneous nucleation is important in accomplishing the controlled ice crystal growth of this invention.

Commercially available coffee extracts generally have concentrations of less than 50% soluble solids, usually about 15 to 30% soluble solids. Such extracts will require relatively long periods of time to be statically frozen (without seeding) into a nonordered dendritic ice crystal distribution. Generally, when freezing coffee extract, a freezing time ranging from 30–120 minutes is required to produce a uniformly dark brown color in the final freeze dried product. In producing the dendritic ice crystal structure of this invention it is preferable to uniformly cool the extract from its ice point to below its eutectic point at a heat removal rate of about 1.5 calories per gm. per cc. per minute. However, since it appears that the initial ice crystal growth determines the size and arrangement of the dendritic ice crystals regardless of the freezing rate employed at the latter stages of the freezing step, the controlled freezing step of this invention may be accelerated at these latter stages while still preserving a non-ordered dendritic ice crystal structure. Moreover, the initial ice crystal growth may be accelerated by controlling the cooling rate to suppress supercooling and spontaneous nucleation of ice crystals. In order to control the initial ice crystal formation, the extract as it is cooled to a temperature which approaches the ice point, may be seeded with ice crystals or crystals of frozen coffee extract thereby preventing supercooling of the extract and initiating proper growth of ice crystals. In this manner, spontaneous ice crystal nucleation will be suppressed while at the same time allowing an acceleration of the freezing rate to about 15–30 minutes.

It is the purpose of this invention to control the color of freeze-dried coffee extract to a degree where it approaches the color of ground, freshly roasted coffee. This can be readily determined visually and will be found to fall within a Munsell color rating of between 12.5, 2.5/4 and 17.5, 5/6. This method of color measurement is described in the "Munsell Book of Color" by A. H. Munsell, 1942 edition. The Munsell nomenclature is described by three numbers representing hue (color), value (lightness or darkness), and chroma (strength or weakness). Hue is indicated by numbers (1–100), value by numbers (0 to 10), and chroma by numbers (0 to 10). In describing color by this system, the hue is given first, followed by another two numbers written in fraction form, the numerator indicating the value and the denominator indicating the chroma. Thus, the notation 12.5, 2.5/4 indicates that the hue or color of the sample is 12.5, the value or lightness is 2.5, and the chroma or intensity is 4.

It is understood that once the desired color in the frozen extract is attained, that it can be lost by indiscriminate subdivision or grinding of the frozen or dried product. If, for example, the product is ground to an excessively fine state where more than 35% passes through a 40 mesh U.S. Standard Sieve Screen, then the beneficial color effect derived by slowly freezing the extract is lost. A good particle size distribution for the final product would be at least 90% retained on a 40 mesh U.S. Standard Sieve Screen.

This invention will now be described by reference to the following specific examples:

EXAMPLE 1

Coffee extract having a soluble solids concentration of 27% coffee solids was separated into two portions and placed in two aluminum freezing molds having dimensions of 40″ x 20″ x ½″. The coffee extract at this point had a product temperature of 55° F. One freezing mold was immersed in liquid nitrogen having a temperature of −329° F. and was completely frozen within a period of one to three minutes. The second mold was placed in a freezing room in contact with a freezing platen having a temperature of −40° F. Ambient temperature of the freezing room was about −10° F. About 15–20 minutes was required for the coffee extract to reach its ice point of 26–28° F. and approximately 60–90 minutes were required to completely cool the extract to below its eutectic point of −13.5° F. Both samples of extract were then removed from their molds and freeze-dried to a terminal moisture of less than 5% in the presence of vacuum of less than 500 microns. Drying time was about 18 hours and the product temperature of the frozen product was kept below −13.5° F. during sublimation in order to avoid any melting of product.

The first extract, frozen with liquid nitrogen, was found to have a light tan, uncoffee-like color upon drying, while the second extract which was slowly frozen in the freezing room was found to have a uniformly dark brown color which was identical in appearance to regular roasted and ground coffee. The second sample had a Munsell color rating of between 15 and 17.5 in hue, between 3 and 5 in value and 4 and 7 in chroma or 15, 3/4 to 17.5, 4/7. Cross-sections of each extract were viewed under a microscope having a magnification of 200 times the original size and the ice crystal structure was determined from the open spaces left in the dried structure by the sublimated ice crystals. The fast-frozen extract was found to have a highly ordered arrangement of substantially parallel needle-like pores similar to the ice crystal structure shown in FIGURE 1 of the drawing while the slow-frozen extract had a highly random and non-ordered distribution of openings which were of substantially larger size than the needle-like pores of the fast-frozen product. The openings in the slow-frozen product resembled the large dendritic ice crystal structure of FIGURE 4 of the drawing.

The color differences in the product persisted upon grinding the freeze-dried slabs of coffee extract in a Fitzpatrick Mill to a mesh size distribution wherein 90% of the particles were retained on a 40 mesh U. S. Standard Sieve Screen. The slow-frozen product retained a dark brown color identical to that of regular roasted and ground coffee.

EXAMPLE 2

Coffee extract having a soluble solids level of 27% coffee solids was separated into two 75 ml. portions and placed in separate 3 inch aluminum foil molds having a thickness of about ½ inch. The extract at this point had a temperature of 65° F. One mold was immersed in liquid nitrogen and found to freeze within a period of less than one minute. The second mold was placed in a constant temperature bath maintained at 20° F. and allowed to reach a temperature of 27° F. in a period of 5 minutes. The extract was agitated with a small propeller during the initial ice formation to accomplish uniform dispersion of ice crystals throughout the extract and prevent supercooling of the extract. Agitation was ceased when the temperature of the extract reached 25° F. The partially frozen extract was held for 10 minutes and then placed in a freezing room having an ambient temperature of −20° F. Freezing time from the ice point to the eutectic point was about 40 minutes. The two samples were then freeze-dried at sublimation temperatures of below −13.5° F.

The slow frozen samples was dark brown in color as in Example 1 while the fast frozen sample was a light tan color similar to the fast frozen product of Example 1. Analysis of the dried samples showed the same differences in cellular structure that were shown in Example 1. The freeze dried slabs were then ground to a particle size distribution approaching that of regular roasted and ground coffee. The color differences in the samples remained the same, the fast frozen product being light brown or tan in color while the slow frozen sample was a dark brown color identical with the natural color of roasted and ground coffee.

EXAMPLE 3

The procedure of Example 2 was followed with the exception that the slow frozen extract was seeded while being cooled to below its ice point. The extract was seeded with 0.2 gram of ice frost prepared by allowing moisture from the air to form on a chilled metal plate. Seeding was accomplished while the extract was being agitated and while the extract was still in a substantially liquid state, the temperature of the extract being about 25°–28° F. The small ice crystals dispersed uniformly throughout the extract due to the agitation and were found to suppress spontaneous nucleation and supercooling of the coffee extract. Agitation was discontinued when the extract reached a temperature of about 23° F. The partially frozen extract was held for about 5 minutes and then slowly frozen as in Example 1. Freezing time from the ice point to the eutectic point was about 35 minutes. The two samples were then freeze dried at sublimation temperatures of below −13.5° F. Again, the slow frozen product was found to be uniformly dark brown in color and identical in all respects to the slow frozen product of Examples 1 and 2 while the fast frozen product was a light tan color. Analysis of these samples under a microscope gave the same cellular differences found in the samples of Examples 1 and 2. The cellular differences in the samples persisted upon grinding the extract to a particle size distribution similar to that of regular roasted and ground coffee.

EXAMPLE 4

The procedure of Example 3 was followed with the exception that no agitation was employed as the extract was seeded. The slow frozen sample was seeded upon being cooled to a temperature just below 28° F. and the freezing time required to develop a non-ordered dendritic ice crystal structure was found to be about 45 minutes as measured from the ice point to the eutectic point. The slow frozen product and the fast frozen product has the same color and cellular differences which were found in samples of Examples 1, 2 and 3. The cellular differences of the dark colored and light colored products were confirmed upon microscopic analysis and again found to be due to the cellular formation of the dried extract. The color differences in the two products persisted upon grinding the extract to a particle size distribution similar to that of regular roasted and ground coffee.

While this invention has been described by reference to specific examples, it is understood to be limited only by the scope of the appended claims.

I claim:

1. A process for producing freeze-dried coffee of dark coffee-like color having a Munsell color rating of between 12.5, 2.5/4 and 17.5, 5/6 which comprises slowly cooling coffee extract with agitation from its ice point to below its eutectic point over a period of about 15–30 minutes, to thereby form a crystalline structure of substantially pure water ice distributed in a frozen matrix of a eutectic mixture of water, said water ice having a dendritic form characterized by nonparallel main stems, smaller extending branches from said main stems and an absence of discrete ice crystals of nondendritic form in the eutectic mixture located between said dendritic ice crystals, coffee solids and aromatics; and freeze-drying said frozen matrix to a stable moisture content.

2. A process for producing freeze-dried coffee of dark coffee-like color having a Munsell color rating of between 12.5, 2.5/4 and 17.5, 5/6 which comprises slowly cooling coffee extract from its ice point to below its eutectic point over a period of about 15–30 minutes, said extract being agitated as it is cooled below its ice point to thereby avoid supercooling and spontaneous nucleation while forming discrete crystals of substantially pure water ice in a liquid mixture of water, coffee solids, and aromatics, and being further cooled to below its eutectic point in a static manner; and then freeze-drying said frozen extract to a stable moisture content.

3. The procedure of claim 2 wherein the extract is seeded as it is cooled to below its ice point.

References Cited

UNITED STATES PATENTS

| | | | |
|---|---|---|---|
| 2,292,447 | 8/1942 | Irwin | 99—199 |
| 2,431,496 | 11/1947 | Natelson et al. | 99—71 |
| 2,685,783 | 8/1954 | Benscheidt et al. | 99—199 X |

OTHER REFERENCES

Harris, R. J. C.: "Biological Applications of Freezing and Drying," Academic Press, Inc., New York, 1954, pp. 90–100.

Sivetz, M. N.: "Coffee Processing Technology," 1963, Avi Pub. Co., Inc., Westport, Conn., vol. 2, pp. 120 and 136.

MAURICE W. GREENSTEIN, *Primary Examiner.*